Patented Nov. 24, 1931

1,833,272

UNITED STATES PATENT OFFICE

KARL WILKE, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

BETA-ANTHRAQUINONE-CARBOXYLIC ACIDS AND THE ESTERS THEREOF AND PROCESS OF PREPARING THEM

No Drawing. Application filed June 6, 1929, Serial No. 369,016, and in Germany June 21, 1928.

The present invention relates to beta-anthraquinone-carboxylic acids and the esters thereof and to a process of preparing them.

I have found that by the influence of an alkali metal salt of hydrocyanic acid, beta-anthraquinone-aldehydes are easily capable of combining additively with hydroxyl-containing compounds of the formula: R—OH wherein R stands for hydrogen, alkyl or aryl, as for instance water, alcohol or phenol. By this operation there are obtained the leuco compounds of anthraquinone-carboxylic acids and the esters thereof, respectively:

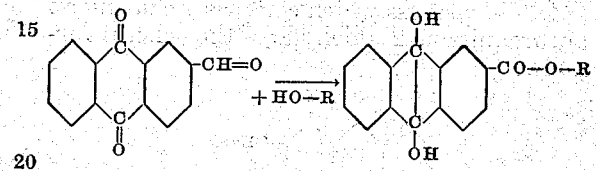

By oxidation of these intermediate vats, as for instance by means of air, the corresponding anthraquinone derivatives are obtained with a good yield.

The reaction may already be effected by mixing the components at ordinary temperature, it being partially preferable to heat the reaction mixture on the water-bath.

The anthraquinone-2-carboxylic acid esters thus obtained correspond to the following formula:

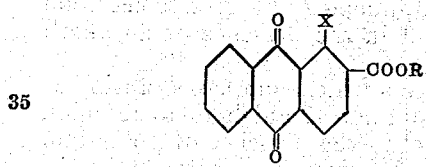

wherein R stands for alkyl or aryl and X for hydrogen, halogen or an amino group, generally forming faintly colored, crystalline bodies which may be used as intermediate products for the manufacture of dyestuffs.

The following examples serve to illustrate my invention, but they are not intended to limit it thereto, the parts being by weight.

(1) A finely subdivided thin aqueous paste of 10 parts of beta-anthraquinone-aldehyde to which 10 parts of potassium cyanide (or sodium cyanide) have been added, is thoroughly stirred at water-bath temperature and under free access of air until the first formed yellowish-red vat has turned brownish-yellow. Thereupon the mass is filtered and the beta-anthraquinone-carboxylic acid precipitated from the filtrate by acidifying the latter with acetic acid, filtered by suction, washed and dried. It has the following constitution:

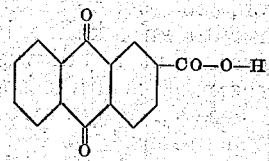

and forms when re-crystallized from glacial acetic acid a brownish-yellow, crystalline powder of the melting point of 286° C. to 287° C.

(2) 3 parts of powdered potassium cyanide are introduced, while well stirring, into a suspension prepared from 10 parts of beta-anthraquinone-aldehyde in 100 parts of methyl alcohol. Under self-evolution of heat a deep-red vat is immediately formed from which the methyl-ester of the beta-anthraquinone-carboxylic acid of the following formula:

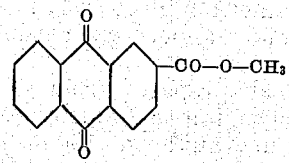

is separated by the action of air. By re-crystallization from wood spirit the product is freed from small quantities of free carboxylic acid which simultaneously have been formed, and obtained in the form of a pale-yellow crystalline powder having its melting point at 170° C.

The beta-anthraquinone-carboxylic acid ethyl-ester is obtained in the same manner, when using ethyl alcohol instead of methyl alcohol. The product melts when re-dissolved from methyl alcohol at 147° C.

(3) 20 parts of 1-iodo-anthraquinone-2-aldehyde (obtained by substituting in the 1-amino-anthraquinone-2-aldehyde, iodine for the amino group, melting point 198° C. to 199° C.) are treated in an open ball mill with 10 parts of potassium cyanide and 150 parts of methyl alcohol until there can no longer be observed any traces of a red vat. Thereupon the mass is diluted with water, filtered, washed with a dilute solution of sodium carbonate and then with water and dried. After recrystallization from alcohol, the resulting 1-iodo-anthraquinone-2-carboxylic acid methyl-ester melts between 172° C. and 175° C. The product forms a bright, light-brown, crystalline powder and has the following constitution:

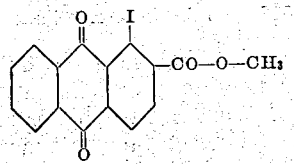

(4) 10 parts of 1-amino-anthraquinone-2-aldehyde are treated according to Example 3 with 10 parts of potassium cyanide in about 100 parts of methyl alcohol until a test sample taken from the reaction mixture does no longer form with an alkaline hydrosulfite solution a green, but a yellowish-red vat. Thereupon the mass is diluted with water, oxidized, if necessary, by introducing air for a short time, filtered, washed and dried. The resulting 1-amino-anthraquinone-2-carboxylic acid methyl-ester crystallizes from glacial acetic acid in the form of red needles, melts at 228° C. and has the following formula:

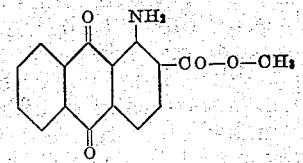

The corresponding amino-carboxylic acid ethyl-ester melting at 198° C. is obtained in an analogous manner, when using ethyl alcohol.

(5) A melt prepared from 10 parts of 1-amino-anthraquinone-2-aldehyde, 10 parts of potassium cyanide and 100 parts of phenol is stirred on the water-bath until a test sample of the melt does no longer form in an alkaline hydrosulfite solution the characteristic green vat of the aldehyde. Thereupon the mixture is diluted with water, filtered, washed and dried. The 1-amino-anthraquinone-2-carboxylic acid phenyl-ester thus obtained crystallizes from glacial acetic acid in the form of bright, reddish-golden crystals, melts at 198° C. and has the following formula:

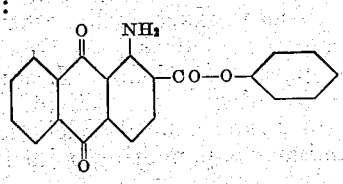

I claim:

1. The process which comprises causing an anthraquinone-2-aldehyde to act upon a compound of the formula: R—OH wherein R stands for hydrogen, alkyl or a benzene residue in the presence of an alkali metal cyanide.

2. The process which comprises causing an anthraquinone-2-aldehyde to act upon a compound of the formula: R—OH wherein R stands for hydrogen, alkyl or a benzene residue, in the presence of potassium cyanide while heating on a water-bath.

3. The process which comprises causing an anthraquinone-2-aldehyde of the general formula:

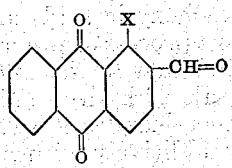

wherein X stands for hydrogen, halogen or an amino group, to act upon a compound of the formula: R—OH wherein R stands for hydrogen, alkyl or phenyl, in the presence of an alkali metal cyanide.

4. The process which comprises causing an anthraquinone-2-aldehyde of the general formula:

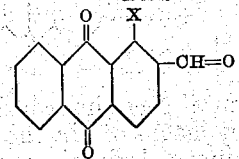

wherein X stands for hydrogen, halogen or an amino group, to act upon a compound of the formula: R—OH wherein R stands for hydrogen, alkyl or phenyl, in the presence of potassium cyanide while heating on a water-bath.

5. The process which comprises causing 1-amino-anthraquinone-2-aldehyde to act upon methyl alcohol in the presence of an alkali metal cyanide.

6. The process which comprises causing 1-amino-anthraquinone-2-aldehyde to act upon methyl alcohol in the presence of potassium cyanide while heating on a water-bath.

7. As new products, compounds of the following general formula:

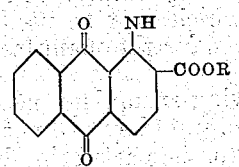

wherein R stands for alkyl or a benzene residue, generally forming faintly colored crystalline bodies.

8. As new products, compounds of the following general formula:

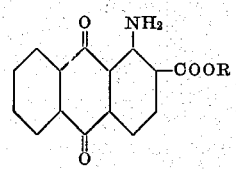

wherein R stands for alkyl or phenyl, generally forming faintly colored crystalline bodies.

9. As a new product, 1-amino-anthraquinone-2-carboxylic acid methyl-ester being a red crystalline powder and melting at 228° C.

10. As a new product, 1-amino-anthraquinone-2-carboxylic acid phenyl-ester being a bright, reddish-golden crystalline powder and melting at 198° C.

In testimony whereof, I affix my signature.
KARL WILKE.